United States Patent
Sasaki et al.

(10) Patent No.: US 6,791,602 B1
(45) Date of Patent: Sep. 14, 2004

(54) FRAME SWITCHER AND METHOD OF SWITCHING, DIGITAL CAMERA AND MONITORING SYSTEM

(75) Inventors: Yuhi Sasaki, Yokohama (JP); Toshiaki Shinohara, Omiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/553,150

(22) Filed: Apr. 20, 2000

(30) Foreign Application Priority Data

Apr. 30, 1999 (JP) .......................................... 11-124952

(51) Int. Cl.[7] .............................. H04N 5/91; H04N 5/92
(52) U.S. Cl. ..................................................... 348/159
(58) Field of Search ................................. 348/153, 159, 348/705; 386/109, 46, 52; H04N 5/92, 5/91

(56) References Cited

U.S. PATENT DOCUMENTS 5,625,410 A * 4/1997 Washino et al. ............ 348/154
6,091,455 A * 7/2000 Yang ....................... 375/240.01
6,167,084 A * 12/2000 Wang et al. ............ 375/240.02
6,208,376 B1 * 3/2001 Tanaka et al. ............... 348/153
6,643,453 B1 * 11/2003 Arai et al. .................... 386/109

FOREIGN PATENT DOCUMENTS

JP            686265        3/1994

OTHER PUBLICATIONS

European Search Report dated Nov. 17, 2003.

* cited by examiner

*Primary Examiner*—Nhon Diep
(74) *Attorney, Agent, or Firm*—Stevens, Davis, Miller & Mosher, LLP

(57) ABSTRACT

A plurality of digital cameras that are synchronized are connected to a switcher, thus constructing a digital monitoring system in which image signals from the cameras are switched and received. A method of switching the image signals includes the steps of setting transmission timings and transmission cycles of I frames from the digital cameras, buffering the image signals of one cycle from the cameras, and extracting necessary I frames from the buffered image signals. Even though the digital image signals include frames depending upon other frames such as P frame and B frame, the I frames are received by switching operation.

21 Claims, 7 Drawing Sheets

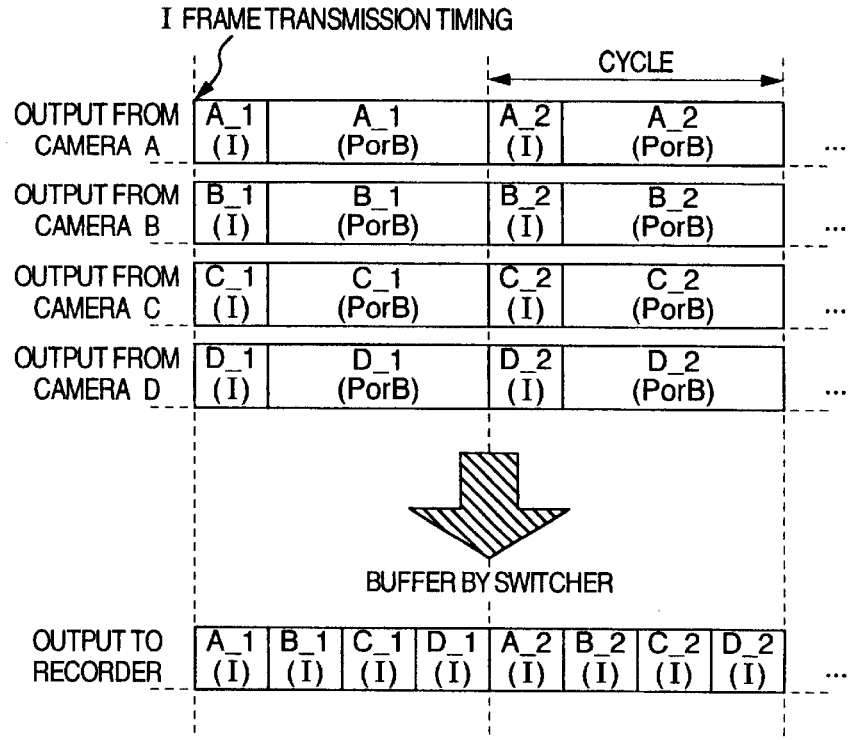
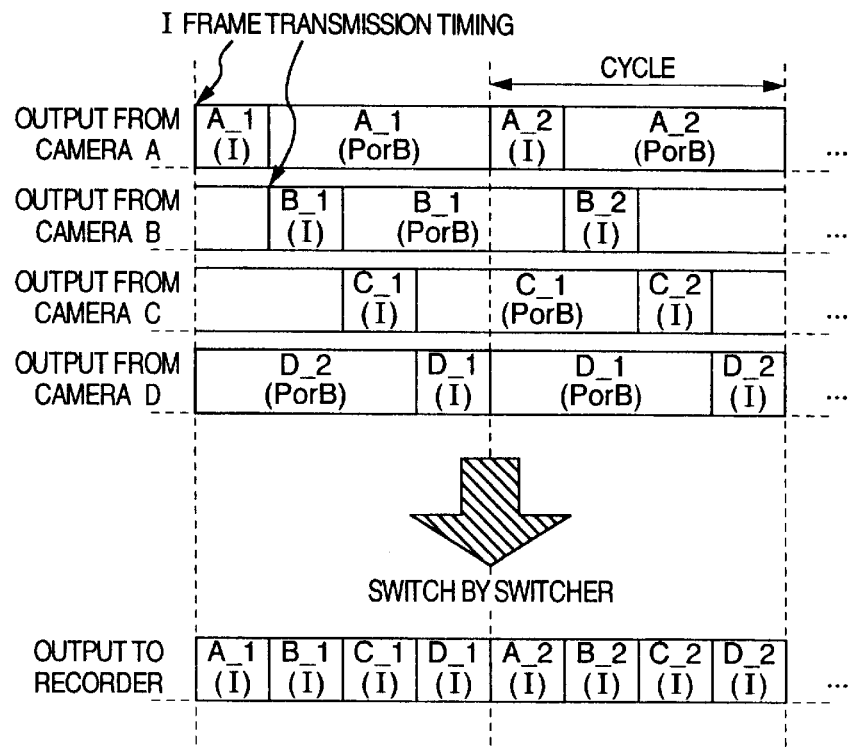

FRAME SWITCHER AND METHOD OF SWITCHING, DIGITAL CAMERA AND MONITORING SYSTEM

BACKGROUND OF THE INVENTION

This present invention relates to a frame switcher and a switching, for example, the frame switcher and the switching method of recording and reproducing image signals with high efficiency while frames of images from a plurality of cameras of a monitoring system are switched, and a digital camera and the monitoring system using the frame switcher.

In recent years, a monitoring system has been widely used in which moving pictures or still pictures are picked up by digital cameras, the data from the cameras are processed and recorded by a recording/reproducing apparatus, and the data are processed, stored and reproduced by a reproducing apparatus. There is a conventional monitoring system in which the image signals from a plurality of digital cameras are transmitted to a recording/reproducing apparatus as, for example, shown in FIGS. 8 and 9.

The monitoring system shown in FIG. 8 uses a plurality of analog cameras A, B, C, D. The image signals from these cameras A–D are received by a monitoring system 1, sequentially switched at certain intervals of time by a switch 2 provided within the monitoring system 1, and stored in storage unit 3.

FIG. 9 shows outputs from the cameras A–D and an output to the storage unit 3 from the monitoring system 1. Each of the cameras A–D that is an analog camera always produces an image signal of frame units at certain intervals of time (for example, 1/30 second). Therefore, when the switch 2 switches the cameras A–D in turn at these time intervals, the frames are sent from all the different cameras to the storage unit as shown in FIG. 9.

However, when digital cameras for producing MPEG outputs are used in place of those cameras in order to record the image signals from the cameras, the frames from the cameras cannot be freely switched because the MPEG includes frames of P-frame and B-frame that depend on other frames.

Accordingly, it is an object of this invention to provide a frame switcher and a switching method for switching frames in MPEG in a digital monitoring system, and a digital camera and a monitoring system using the switcher.

It is another object of the invention to provide a frame switcher and a switching method for recording and reproducing image signals with high efficiency while frames of images from a plurality of cameras are switched, and a digital camera and a monitoring system using the switcher.

SUMMARY OF THE INVENTION

In order to achieve the above objects, the invention proposes a digital monitoring system constructed by connecting a plurality of MPEG cameras that can be synchronized, to a switcher for switching the image signals from the cameras, and a method of switching the image signals in which the MPEG cameras can be controlled to set the transmission timings and cycle times of I frames, and the image signals of one cycle from the cameras can be buffered, and only the necessary I frames can be extracted from the buffered image signals.

As a modification of the above embodiment, the transmission timings of I frames from the cameras are shifted in the method of switching the image signals in which the image signals of one cycle from the cameras are buffered and then only the necessary I frames are extracted.

In place of the buffering operation in the above two examples, the I frames from the cameras are transmitted with the transmission timings of I frames being shifted, and the switcher switches the image signals from the cameras in accordance with the transmission timings of I frames. In this case, while the transmission timings of I frames from the cameras are shifted, only the I frames from the cameras can be transmitted and received on a single channel in a time sharing manner.

Also, according to the invention, there is provided a digital camera having imaging means for picking up images, digitizing means for converting the produced image signal into a digital signal, timing control means for controlling the transmission timing of I frame of the image signal, setting means for setting the timing of the timing control means and the transmission cycle of I frame, and transmitting means for transmitting the image signal. In this camera, I frame extracting means for extracting the necessary I frame from the image signal can be further provided to extract and transmit the I frame of the image signal with a certain timing.

According to the invention, there is also provided a frame switcher having receiving means for receiving image signals from a plurality of cameras that produce digital image signals and are synchronized, buffer means for temporarily storing the image signals of one cycle received from the plurality of cameras, I frame extractor means for extracting only the I frames from the image signals stored in the buffer means, timing control means for controlling the operation timing of the I frame extractor means, setting means for setting the timing of the timing control means, and transmitting means for transmitting the image signals, whereby the I frames of image signals are extracted from the buffer means and transmitted with a certain timing. In the frame switcher, setting means is further provided to set the synchronization of the plurality of cameras so that the I frames are simultaneously transmitted and to set the cycle times so that they are transmitted with the same cycle time.

According to the invention, there is also provided another frame switcher having receiving means for receiving image signals from a plurality of cameras that produce digital image signals and are synchronized, channel switching means for switching channels on which the image signals are received, to a channel for a camera that is transmitting an I frame, timing control means for controlling the switching timing of the channel switching means, setting means for setting the timing of the timing control means, and transmitting means for transmitting the image signals, whereby the I frames of image signals are received and transmitted with a certain timing. In the frame switcher, buffer means are provided for storing part of I frame data of the image signals received from the plurality of cameras. In addition, setting means is provided to set the synchronization of the plurality of digital cameras so that the transmission timings of I frames are made different and set so that the transmission cycle times of I frames are same.

With those constructions, even though digital cameras are used, the images picked up by a plurality of cameras are efficiently switched for their frames, and transferred to the recorder or reproducer.

A digital monitoring system of claim 1 is constructed by MPEG cameras that are synchronized, and a switcher. The cameras are set as to the transmission timings and transmission cycle times of I frames. The image signals of one cycle from the cameras are buffered, and only the necessary I frames are extracted from the buffered image signals. Even though the digital image signals include frames depending upon other frames, such as P frame and B frame, the frames are switched so that the desired I frames are received.

A digital monitoring system of claim 2 is constructed by MPEG cameras that are synchronized, and a switcher. The cameras are set as to the transmission timings and transmission cycle times of I frames. The image signals of one cycle from the cameras are buffered, and only the necessary I frames are extracted from the buffered image signals. In the extraction process, the transmission timings of I frames from the plurality of cameras are shifted, and the digital image signals are received by frame switching.

A digital monitoring system of claim 3 is constructed by MPEG cameras that are synchronized, and a switcher. The cameras are set as to the transmission timings and transmission cycle times of I frames. The switcher switches the image signals from the cameras in accordance with the transmission timings of I frames. The transmission timings of I frames from the plurality of cameras are shifted so that the image signals are accurately and fast received with less buffer.

A digital monitoring system of claim 4 is constructed by MPEG cameras that are synchronized, and a switcher. The cameras are set as to the transmission timings and transmission cycle times of I frames. The switcher switches the image signals from the cameras in accordance with the transmission timings of I frames. The transmission timings of I frames from the plurality of cameras are shifted so that only the I frames are transmitted and that a single channel is shared by the plurality of cameras in a time sharing manner. Thus, the frequency band on the network between the cameras and the switcher is effectively used.

A method of switching image signals of claim 5 uses a plurality of cameras that produce digital image signals and are synchronized, and a switcher for switching the image signals from the plurality of cameras. The method has the steps of setting synchronization of a plurality of cameras so that the I frames are simultaneously transmitted, and the transmission cycle times of I frames so that the I frames are transmitted with the same cycle time, buffering the image signals of one cycle from the plurality of cameras, and extracting, by switching only the necessary I frames, from the buffered image signals. Thus, even though the digital image signals include frames depending upon other frames such as P frame and B frame, the digital image signals are received by frame switching.

A method of switching image signals of claim 6 uses a plurality of cameras that produce digital image signals and are synchronized, and a switcher for switching the image signals from the plurality of cameras. The method has the steps of setting synchronization of a plurality of cameras so that I frames are simultaneously transmitted, and the transmission cycle times of I frames so that the I frames are transmitted with the same cycle time, buffering the image signals of one cycle from the plurality of cameras, and extracting, by switching the necessary I frames, from the buffered image signals while the transmission timings of I frames from the cameras are shifted. Thus, the digital image signals are received by frame switching.

A method of switching image signals of claim 7 uses a plurality of cameras producing digital image signals and synchronized, and a switcher for switching the image signals from the plurality of cameras. The method has the steps of setting synchronization of a plurality of cameras so that the transmission timings of I frames are made different, and the transmission cycle times of I frames so that the I frames are transmitted with the same cycle time, and transmitting the I frames in such a manner that they are switched in synchronism with the above different transmission timings of I frames and that the operation timings of the cameras are shifted. Therefore, the image signals are fast and accurately received with less buffer.

A method of switching image signals of claim 8 uses a plurality of cameras producing digital image signals and synchronized, and a switcher for switching the image signals from the plurality of cameras. The method has the steps of setting synchronization of a plurality of cameras so that the transmission timings of I frames are made different, and the transmission cycle times of I frames so that the I frames are transmitted with the same cycle time, and transmitting only the I frames in such a manner that the I frames are switched in synchronism with the above different transmission timings of I frames and that the operation timings of the cameras are shifted, in which a single channel is shared by the plurality of cameras in a time sharing manner. Thus, the frequency band on the network between the cameras and the switcher are effectively used.

A digital camera of claim 9 has imager means for picking up images, digitizing means for converting the produced image signal into a digital signal, timing control means for controlling a transmission timing of I frame of the image signal, setting means for setting a timing of the timing control means and a transmission cycle time of I frame, and transmitting means for transmitting the image signal. Thus, the I frame of the image signal are transmitted with a certain timing and in a different way according to the settings in the system.

A digital camera of claim 10 has imager means for picking up images, digitizing means for converting the produced image signal into a digital signal, I frame extracting means for extracting the necessary I frame from the image signal, timing control means for controlling a transmission timing of the I frame, setting means for setting a timing of the timing control means and a transmission cycle time of I frame, and transmitting means for transmitting the image signal. Thus, since the I frame of the image signal are transmitted to the switcher with a certain timing, the construction of the switcher and the necessary processing load on the switcher are simplified and reduced, respectively. In addition, it is possible to decrease the amount of data to be transmitted as the image signal.

In a digital camera of claim 11 according to claim 9 or 10, the setting means is provided to set a synchronization of a plurality of cameras so that I frames from the cameras are simultaneously transmitted, and a transmission cycle times so that the I frames are transmitted with the same cycle time. Even though the digital image signals include frames depending upon other frame, such as P frame and B frame, the switcher receiving the image signals switches the frames to easily receive the I frames.

In a digital camera of claim 12 according to claim 9 or 10, the setting means is provided to set synchronization of a plurality of cameras so that transmission timings of I frames are made different, and transmission cycle times so that the I frames are transmitted with the same cycle time. Thus, the switcher receiving the digital image signals switches the image signals with less buffer and delay to receive the I frames.

A frame switcher of claim 13 has receiving means for receiving the image signals from a plurality of cameras that produce digital image signals and are synchronized, buffer means for temporarily storing the image signals of one cycle received from the plurality of cameras, I frame extracting means for extracting only the necessary I frames from the buffered image signals, timing control means for controlling an operation timing of the I frame extracting means, setting means for setting a timing of the timing control means, and transmitting means for transmitting the image signals. Since the I frames of the image signals are extracted from the buffer means and transmitted with a certain timing, the digital image signals are received by frame switching even though the digital image signals include frames depending upon other frames such as P frame and B frame.

In a frame switcher of claim 14 according to claim 13, the setting means is provided to set synchronization of a plurality of cameras so that I frames are simultaneously transmitted, and a transmission cycle times so that the I frames are transmitted with the same cycle time. Thus, even though the digital image signals include frames depending upon other frames such as P frame and B frame, the digital image signals are switched so that the I frames are easily received.

A frame switcher of claim 15 has receiving means for receiving the image signals from a plurality of cameras that produce digital image signals and are synchronized, channel switching means for switching the channels on which the image signals are received to a channel for the camera that is transmitting the I frame, timing control means for controlling the switching timing of the channel switching means, setting means for setting a timing of the timing control means, and transmitting means for transmitting the image signals. Thus, since the I frames of image signals are transmitted with a certain timing, they are fast and accurately received.

In a frame switcher of claim 16 according to claim 15, the buffer means is provided to store part of I frame data of the image signals received from a plurality of cameras. Thus, the I frames are received orderly even though the I frames from the cameras are received and overlapped when the channel switching means is switching.

In a frame switcher of claim 17 according to claim 13, 15 or 16, the setting means is provided to set synchronization of a plurality of cameras so that transmission timings of I frames are made different, and transmission cycle times so that the I frames are transmitted with the same cycle time. Thus, the image signals are fast and accurately received with less buffer.

BRIEF DESCRIPTION OF THE DRAWINGS

FIG. 3A schematically shows transmission of image signals from the cameras and storing of image signals in a buffer in the first embodiment.

FIG. 3B shows I frames extracted from the buffered image signals by switching in the first embodiment.

FIG. 4A schematically shows transmission of image signals from the cameras and storing of image signals in a buffer in a modification of the first embodiment.

FIG. 4B shows I frames extracted from the buffered image signals by switching in the modification of the first embodiment.

DESCRIPTION OF THE EMBODIMENTS

Embodiment 1

Figure 1:
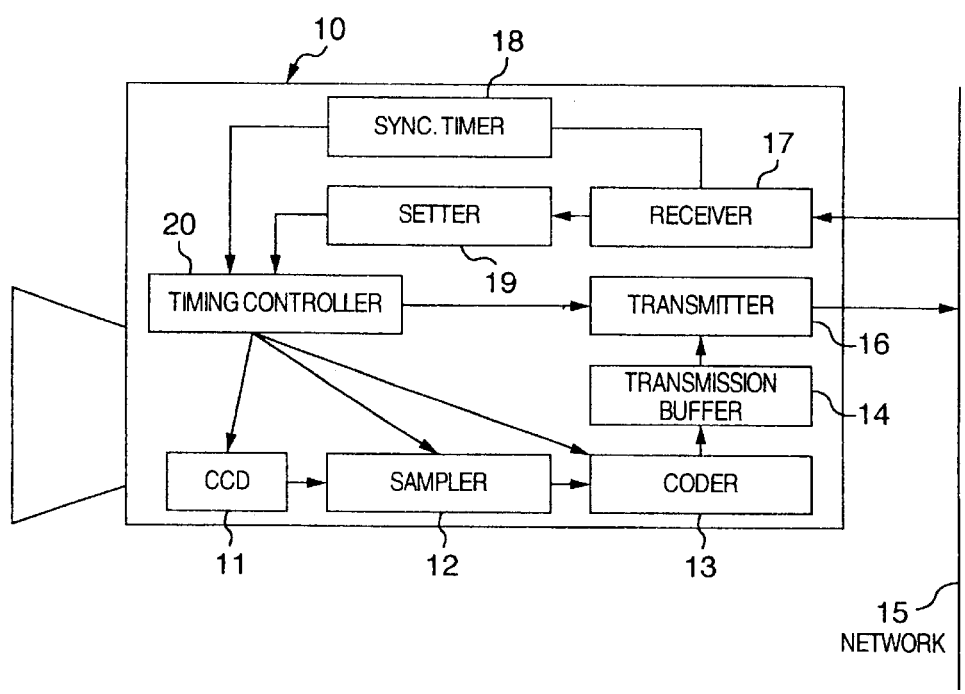
FIG. 1 is a block diagram showing the construction of one of the cameras used in a monitoring system of a first embodiment according to the invention.
Figure 2:
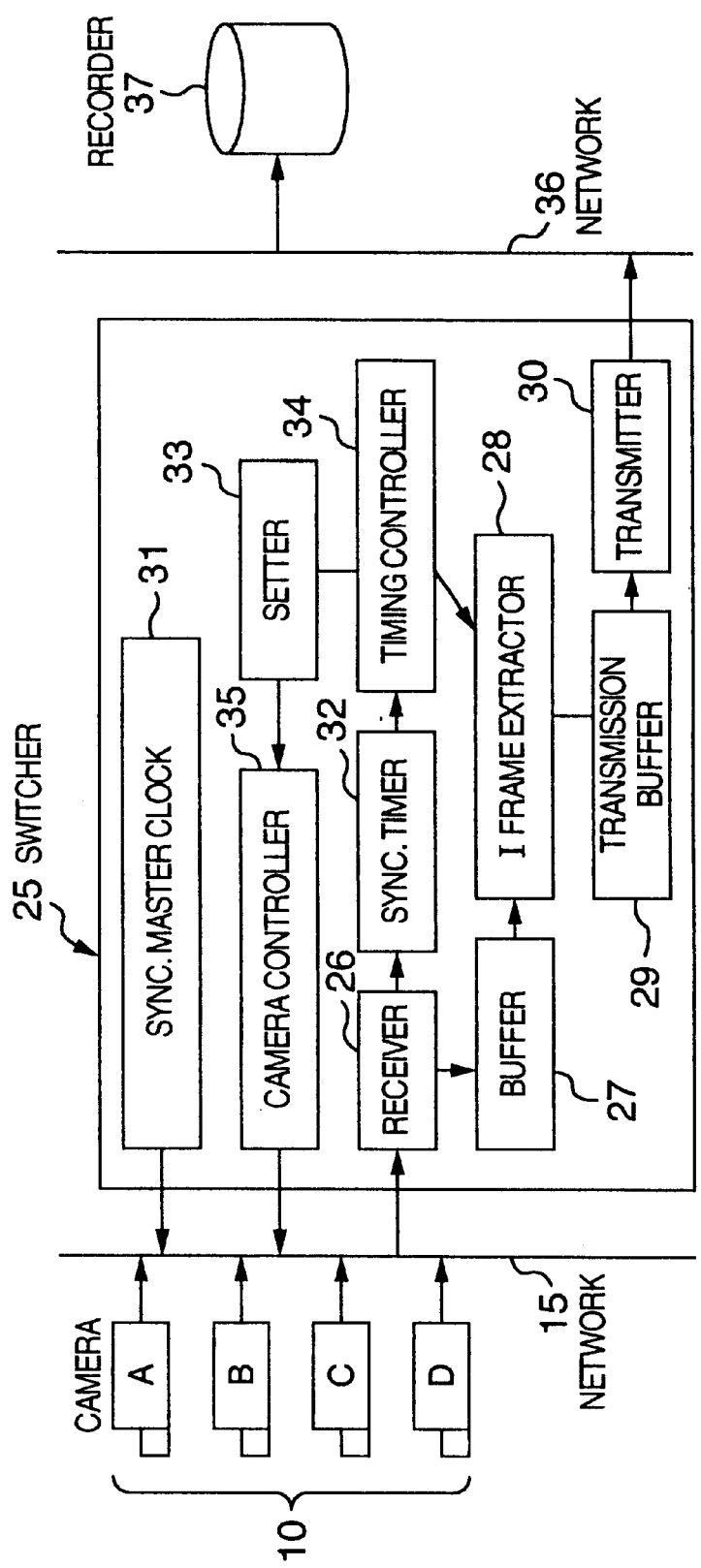
FIG. 2 is a block diagram of a switcher connected to the camera in the first embodiment so that image signals are switched as a frame switcher.

An embodiment of the invention will be described in detail with reference to drawings. FIG. 1 is a block diagram of a camera used in a monitoring system of the first embodiment of the invention. FIG. 2 is a block diagram showing the construction of a switcher that is connected to a plurality of such cameras according to this embodiment, and that switches the I-frame outputs of image signals received from those cameras.

Referring to FIG. 1, there are shown a camera 10 as a digital camera that produces an MPEG output and are synchronized, a CCD image sensor 11 for picking up images to produce an image signal, a sampler 12 for sampling the image signal produced from the image sensor 11, and a coder 13 for compressing and coding the image signal. There are also shown a buffer 14 for temporarily holding the image signal from this camera, a transmitter 16 for transmitting the image signal to a network 15, a receiver 17 for receiving data such as a command sent through the network 15, and a synchronizing timer 18 for synchronizing operations of these elements in the camera 10. In addition, there are shown a setter 19 for setting imaging and transmitting operations within the camera 10, and a timing controller 20 for controlling elements in the camera 10 to be timely operated to control a timing of driving the image sensor 11.

In FIG. 2, reference numeral 25 designates a switcher, 26 a receiver that is connected to the network 15 to receive MPEG signals from a plurality of cameras 10 (camera A, camera B, camera C and camera D), 27 a buffer for temporarily storing the received image signal, 28 an I-frame extractor for extracting I frame of MPEG signal from the stored signal in the buffer 27, 29 a transmission buffer for temporarily holding the I frame until the I frame data extracted by the I-frame extractor 28 is supplied from the switcher 25 to the opponent I/O, 30 a transmitter for transmitting the I frame through a network 36, and 31 a synchronizing master clock for generating a clock signal to control synchronization of the operations of the whole system (monitoring system) including the switcher 25 and the elements or apparatus that are connected to the switcher in order to transmit and receive the image signals. In addition, reference numeral 32 represents a synchronizing timer for synchronizing operations of the elements in the switcher 25, 33 a setter for setting imaging and transmitting operations in the camera 10 and transmitting, receiving and data-processing operations in the switcher 25, 34 a timing controller for controlling an operation timing of each element in the switcher 25 such as driving timings of the receiver 26 and transmitter 30, and 35 a camera controller for generating control data to the cameras 10 in accordance with settings of the setter 33. The switcher 25 has a storage capacity enough to store one cycle of image signals from all the cameras 10 connected to the switcher 25 for a time necessary for the extraction.

The synchronizing master clock 31, setter 33 and camera controller 35 have functions as a system controller for controlling the whole monitoring system, and the switcher 25 serves as a master apparatus for generating various kinds of commands.

Reference numeral 36 designates a network through which the image signal produced from the transmitter 30 of the switcher 25 is transmitted to other I/O apparatus, and 37 a recorder connected to the network 36. The cameras 10, switcher 25 and recorder 37 are connected through the networks 15, 36, thus constituting a monitoring system. The networks 15, 36 are not necessary to be different, but may be the same networks.

Figure 9:
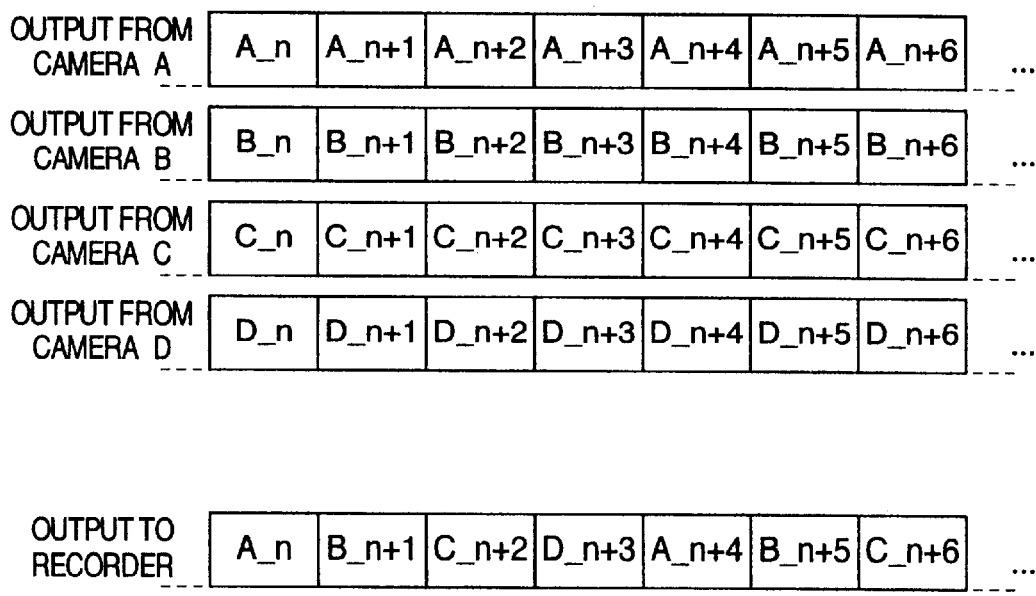
FIG. 9 shows image signals transmitted from the cameras to the monitoring system in the conventional analog monitoring system.

The operation of the monitoring system will be described below. Since a plurality of cameras 10 installed at different places are used as MPEG cameras as described above, these cameras 10 produce digital image signals. The digital image signal from each camera includes frame data of I frame, P frame and B frame as MPEG data. Of these frames, the I frame is to present the contents of the image by itself, but the P frame and B frame depend upon other frames and thus does not reproduce the contents of the image by itself. Therefore, in order to reproduce the frames of images from the respective cameras A–D as shown in FIG. 9, it is necessary to select the I frames from the image signals the cameras A–D of camera 10 send out.

In this embodiment, a plurality of cameras A–D are previously set to simultaneously send the I frames with the same cycle. A setting for the synchronization is performed by the instruction (generation of command) from the switcher 25. In other words, the setter 33 of the switcher 25 generates control data for synchronizing the cameras A–D, making the cameras A–D simultaneously send the I frames. The synchronization setting control data is also supplied as a command to the network 15 through the camera controller 35. The camera 10 receives control data through the receiver 17, and the received data is registered in the setters 19 of the respective cameras A–D. The setting for the transmission cycle is also performed by the instruction (generation of command) from the switcher 25. That is, the setter 33 of the switcher 25 determines transmission cycle times in the cameras A–D and generates data of transmission cycle times and sends it to the cameras A–D so that each of the I frames are transmitted with a certain cycle. The transmission cycle data is also supplied as a command through the camera controller 35 to the network 15. The camera 10 receives cycle data through the receiver 17, and the cycle data is registered in the setters 19 of the respective cameras A–D. The same transmission cycle time is set in the cameras A–D.

In the switcher 25, the timing controller 34 is set so that the frame extractor 28 is simultaneously read from the buffer 29, the I frames associated with the respective cameras A–D in one cycle.

A control signal synchronized with the clock from the synchronizing master clock 31 of the switcher 25 controls the cameras 10 and switcher 25 to make imaging, transmitting and receiving operations. In these operations, a plurality of cameras 10 simultaneously transmit the I frames with a constant cycle according to the synchronization settings. The switcher 25 stores those image signals of one cycle in the buffer 27 (those signals are buffered). FIG. 3A is a schematic diagram showing transmission of the image signals from the camera 10 and storing of those signals in the buffer 27. The I frame extractor 28 extracts only the necessary I frames from the buffered image signals. The I frame extractor 28 is controlled in its operation timing by the timing controller 34 in such a manner that the I frames associated with the cameras A–D are sequentially extracted from the buffered image signals according to the switching operation. In this way, the I frames from the cameras A–D are arranged in time series within one cycle. FIG. 3B shows the extracted I frames. The extracted I frames are temporarily stored in the transmission buffer 29, and then transferred to the transmitter 30. The transmitter 30 supplies the transferred I frames through the network 36 to the recorder 37 where they are recorded.

In a modification of this embodiment, when the setter 33 of switcher 25 generates control data for synchronizing the cameras A–D, the control data is set so that the transmission timings of the I frames are shifted. The synchronization setting control data is also fed as a command through the camera controller 35 to the network 15. The camera 10 receives the control data through the receiver 17, and registers it in the setter 19 of each camera A–D. The setting of the transmission cycle is the same as in this embodiment. The setting of the buffer reading timing in the switcher 25 is also the same as in this embodiment. In the relation between the synchronization setting for the shifted timings of I frame transmission and the setting for I frame transmission cycle, the I frames are respectively once transmitted from all cameras A–D in one cycle.

Under these setting conditions, the camera 10 and switcher 25 are controlled to make imaging, transmitting and receiving operations by the control signal synchronized with the clock from the synchronizing master clock 31 of the switcher 25. At this time, a plurality of cameras 10 transmit image signals with timings of I frames shifted and with a constant cycle according to the above synchronization setting. The switcher 25 stores (buffers) the image signals of one cycle in the buffer 27. FIG. 4A schematically shows transmission of image signals from the cameras 10 and storing of them in the buffer 27. The I frame extractor 28 extracts only necessary I frames from the buffered image signals. In this case, the I frame extractor 28 is controlled in operation timing by the timing controller 34 to sequentially extract, by switching the I frames associated with the cameras A–D from the buffered image signals in the same way as in the above case. Thus, the I frames associated with the cameras A–D are arranged in time series within one cycle. FIG. 4B shows the extracted I frames. The extracted I frames are temporarily stored in the transmission buffer 29, and then transmitted from the transmitter 30 through the network 36 to the recorder 37 where they are stored.

That is, since the switcher 25 has a storage capacity enough to store, for a necessary time for extraction, the image signals of one cycle from all the cameras 10 connected to the switcher 25, the I frames fed from the plurality of cameras 10 are transmitted simultaneously or with their timings shifted.

Embodiment 2

Figure 5:
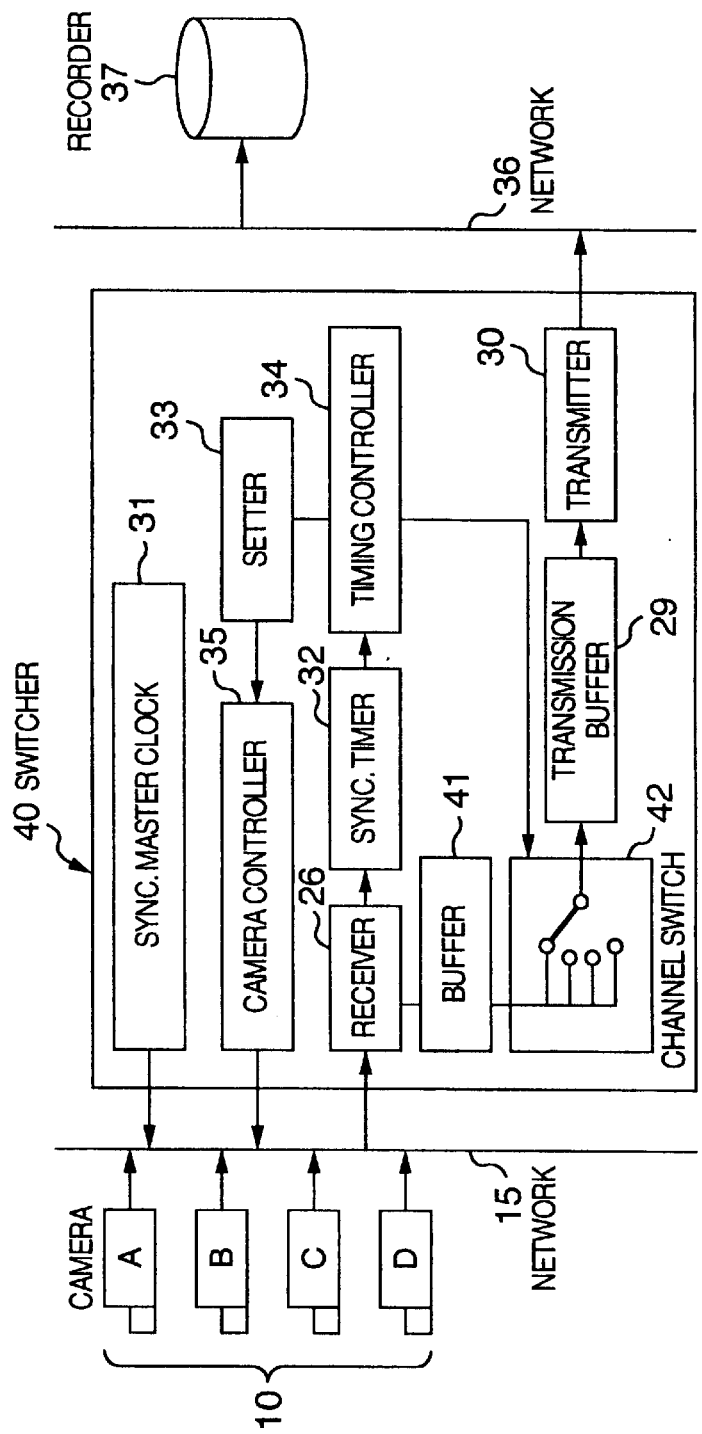
FIG. 5 is a block diagram of a switcher used in a monitoring system of a second embodiment according to the invention.

FIG. 5 is a block diagram of the construction of a switcher used in a monitoring system of the second embodiment of the invention. In the figure, like elements corresponding to those in the switcher of the first embodiment are identified by the same reference numerals, and will not be described in detail.

The switcher 40 shown in FIG. 5 has a buffer 41 connected to the receiver 26, and a channel switch 42 connected to the buffer 41 in order to make switching operation for reading the buffer. The channel switch 42 is connected to the transmission buffer 29. The channel switch 42 is further connected to the timing controller 34 and controlled in a timing of the switching operation. The switcher 40 is different from the switcher 25 of the first embodiment in that the storage capacity is less than that of the switcher 25 because it does not need to store the image signals of one cycle from all the cameras 10 connected to the switcher 40.

An operation of the monitoring system of this construction will be described. First the transmission timings and transmission cycle of I frames are fixed. The setter 33 of the switcher 40 generates control data for synchronizing the cameras A–D in order that transmission timings of the I frames from the cameras A–D are shifted, and supplied as a command through the camera controller 35 to the network 15. The camera 10 receives the control data through the receiver 17, and the data is registered in the setter 19 of each camera A–D. The setting of the transmission cycle is the same as in the first embodiment. In the relation between synchronization setting for the shifted transmission timings of I frames and transmission cycle of I frames, the I frames from all cameras A–D are respectively once transmitted in one cycle.

The timing controller 34 of the switcher 40 is set so that the channel switch 42 switches the image signals from the cameras A–D of the camera 10 in accordance with the established transmission timings (shifted) of I frames to receive the I frames.

Figure 6:
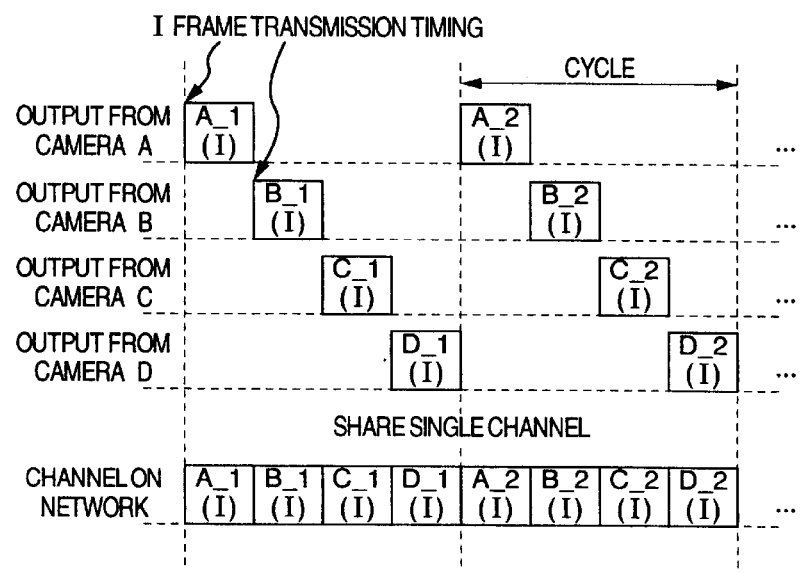
FIG. 6A schematically shows transmission of image signals transmitted from the cameras with transmission timings shifted in the second embodiment.
FIG. 6B shows I frames received by the switcher in the second embodiment.

Under the setting conditions, the cameras 10 and switcher 40 perform imaging, transmitting and receiving operations according to a control signal synchronized with the clock from the synchronizing master clock 31 of the switcher 40. Simultaneously, a plurality of cameras 10 transmit image signals with a constant cycle and with the transmission timings shifted according to the above synchronization setting. FIG. 6A schematically shows the image signals transmitted from the cameras 10. On the switcher 40, the channel switch 42 is controlled by the timing controller 34 so that the I frames are sequentially switched from the cameras A–D to receive the I frames in accordance with the established transmission timings of I frames from the cameras A–D of the camera 10 without buffering the received image signals. Thus, the I frames from the cameras A–D are arranged in time series within one cycle. FIG. 6B shows the I frames received by the switching operation. The received I frames are temporarily stored in the transmission buffer 29, and then supplied through the network 36 to the recorder where they are recorded.

In the second embodiment, although the image signals from a plurality of cameras 10 are received by the channel switch 42, a single channel are shared in a time sharing manner by a plurality of cameras with transmission timings of I frames shifted because a certain one of the transmission timings of I frames limits an operation of the switcher to reception of only the image signal from one camera. In this event, only the I frames from a plurality of cameras 10 are transmitted with transmission timings shifted, and received on a single channel of the switcher in a time sharing manner.

Embodiment 3

Figure 7:
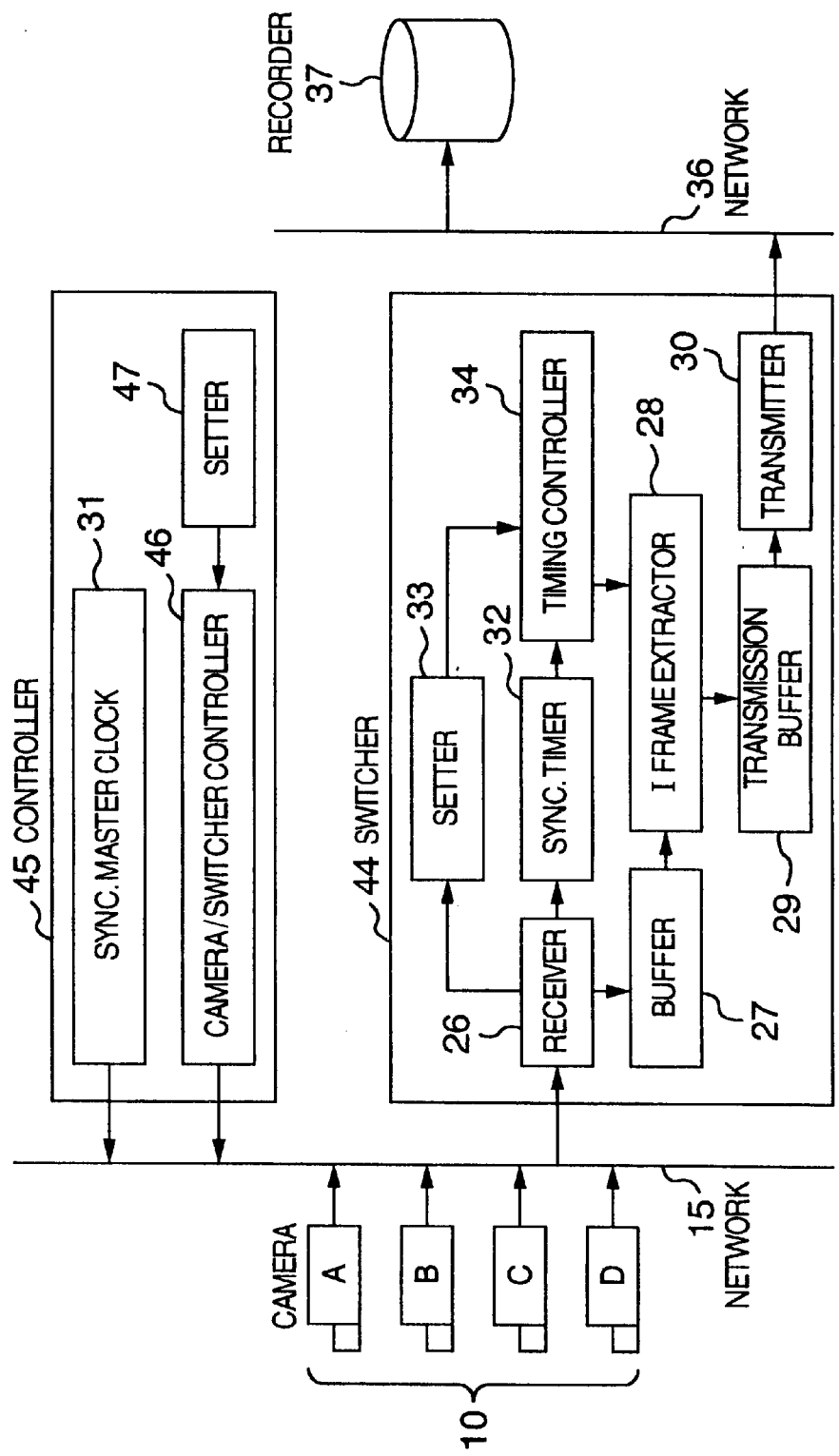
FIG. 7 is a block diagram showing the construction of a monitoring system and the construction of a switcher used in the system in the third embodiment according to the invention.
Figure 8:
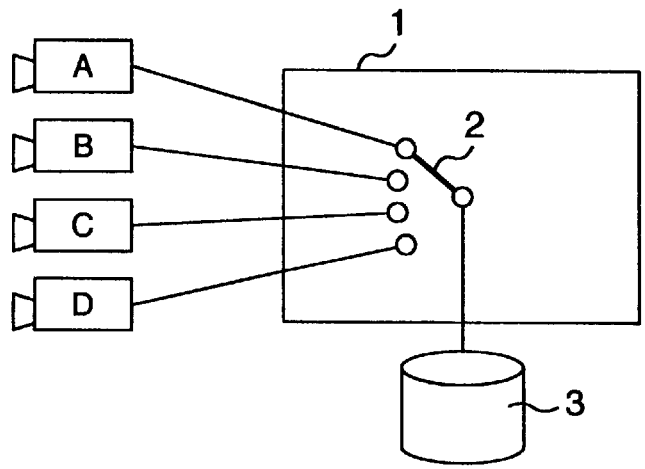
FIG. 8 is a block diagram showing the construction of a conventional analog monitoring system.

Although the switcher 25 has a function to serve as a controller for controlling the system in the first embodiment, the system control function is provided on a network as a separate controller from the switcher 25. FIG. 7 is a block diagram of a monitoring system according to the third embodiment of the invention that has the controller provided separately from the switcher. In FIG. 7, reference numeral 10 represents cameras having MPEG outputs, 44 a switcher for switching the I frames of the image signals received from the plurality of cameras, and 45 a controller for controlling the system. Also, reference numeral 37 designates a recorder for recording the image data, and 15 and 36 networks through which the cameras 10, switcher 44, controller 45 and recorder 37 are connected together to transmit and receive data.

The switcher 44 has fundamentally the same construction as the switcher 25 used in the above first embodiment, but does not have the synchronizing master clock 31 for controlling the system and the camera controller 35. The controller 45 has the synchronizing master clock 31, a camera/switcher controller 46 for sending an operation command to the cameras 10 and a switcher 44, and a setter 47 for setting an operations of the functional elements of the whole system. In this case, the switcher 44 is constructed to receive a setting command from the controller 45 through the network 15 and change the settings.

The controller 45 is not necessarily separately provided as an independent apparatus, but is provided within one of the cameras 10 or within the recorder or another apparatus on the network as in the first embodiment in which the control function was installed within the switcher 25. The second embodiment is also modified in the same manner.

On the other hand, the camera 10 is provided as slave apparatus as in the above embodiment, but in this case a buffer for temporarily storing the image signals and an I frame extractor for extracting the I frames from the image signals stored in this buffer are provided in the camera 10. The camera 10 transmits to the switcher 25 or 40 only the I frames that were already extracted and buffered in the camera 10. In this case, the buffer and I-frame extractor are provided between the coder 13 and the transmission buffer 14 in the structure of camera 10 shown in FIG. 1 so that the output data from the I-frame extractor are transferred to the transmission buffer 14.

Thus, according to the invention, a digital monitoring system is constructed in which a plurality of digital cameras that are synchronized are connected to the switcher so that the image signals from the cameras are switched. As a method of switching the image signals, transmission timings of I frames from the digital cameras and a transmission cycle are set, and the image signals of one cycle from the cameras are buffered so that only the necessary I frames are extracted. Therefore, even though the digital image signals include frames depending upon other frames such as P frame and B frame, only the necessary I frames are switched for reception.

In the case of executing the method of switching the image signals in which the image signals of one cycle from a plurality of cameras are buffered and then only the necessary I frames are extracted, the transmission timings of I frames to be transmitted from a plurality of cameras are shifted, and in this case those I frames are received by frame switching.

In place of the buffering operations in the above two embodiments, the transmission timings of I frames from the cameras are shifted, while the switcher switches the image signals from the cameras in accordance with the transmission timings of I frames. Therefore, even though digital-type cameras are used in the monitoring system, the image signals from the digital cameras are switched by frame switching with high efficiency, and the necessary frames are transferred to the recorder or reproducer by frame switching with less buffer and delay.

In this case, while the transmission timings of I frames from the cameras are shifted, only I frames are transmitted on a single channel in a time sharing manner so that the cameras share one channel. Therefore, the number of channels to be used between the cameras and the switcher are decreased, thus making possible to simplify the constructions of the system and apparatus.

What is claimed is:

1. A digital monitoring system comprising MPEG cameras that are synchronized and a switcher, wherein said cameras are provided to set transmission timings and transmission cycle times of I frames, and said switcher is provided to buffer image signals of one cycle from said cameras and extract the I frames from the buffered image signals to a necessary extent.

2. A digital monitoring system comprising MPEG cameras that are synchronized and a switcher, wherein said cameras are provided to set transmission timings and transmission cycle times of I frames, and said switcher is provided to buffer image signals of once cycle from said cameras and extract the I frames from the buffered image signals to a necessary extent, the transmission timings of I frames from said cameras being shifted.

3. A digital monitoring system comprising MPEG cameras that are synchronized and a switcher, wherein said cameras are provided to set transmission timings and transmission cycle times of I frames, and said switcher as provided to switch image signals from said cameras in accordance with the transmission timings of I frames, the transmission timings of I frames from said cameras being shifted.

4. A digital monitoring system comprising MPEG cameras that are synchronized and a switcher, wherein said cameras are provided set transmission timings and transmission cycle times of I frames, and said switcher is provided to switch image signals from said cameras in accordance with the transmission timings of I frames, the transmission timings of I frames from said cameras being shifted and only the I frames from said cameras being transmitted on a single channel in a time sharing manner.

5. A method of switching image signals comprising the steps of:
providing a plurality of cameras for producing digital image signals, which are synchronized;
providing a switcher for switching the image signals from said cameras;
setting the synchronization of said cameras so that transmission timings and transmission cycle times of I frames are simultaneously performed; and
buffering the image signals of one cycle from said cameras and extracting necessary I frames from the buffered image signals by switching operation.

6. A method of switching image signals comprising the steps of:
providing a plurality of cameras for producing digital image signals, which are synchronized;
providing a switcher for switching the image signals from said cameras;
setting synchronization of said cameras so that transmission timings and transmission cycle times of I frames are simultaneously performed; and buffering the image signals of one cycle from said cameras and extracting necessary I frames from the buffered image signals by switching operation with the transmission timings of I frames being shifted among said cameras.

7. A method of switching image signals comprising the steps of:
providing a plurality of cameras for producing digital image signals, which are synchronized;
providing a switcher for switching the image signals from said cameras;
setting synchronization of said cameras so that transmission timings of I frames are different from each other and transmission cycle times of I frames are identical with each other; and
transmitting the I frames in synchronization with the different transmission timings of I frames with the timings being shifted among said cameras by switching operation.

8. A method of switching image signals comprising the steps of:
providing a plurality of cameras for producing digital image signals, which are synchronized;
providing a switcher for switching the image signals from said cameras;
setting synchronization of said cameras so that transmission timings of I frames are different from each other and transmission cycle times of I frames are identical with each other; and
transmitting only the I frames in synchronization with the different transmission timings of I frames by switching operation with the timings being shifted among said cameras and sharing a signal channel by said cameras in a time division manner.

9. A digital camera comprising:
imaging means for picking up images;
digitizing means for converting an image signal produced by said imaging means into a digital signal;
timing control means for controlling a transmission timing of I frame of the image signal;
setting means for setting a timing of said timing control means and a transmission cycle of the I frame; and
transmitting means for transmitting the image signal, whereby the I frame of the image signal is transmitted with a predetermined timing.

10. A digital camera comprising:
imaging means for picking up images;
digitizing means for converting an image signal produced by said imaging means into a digital signal;
I frame extracting means for extracting a necessary I frame from the image signal;
timing control means for controlling a transmission timing of I frame of the image signal;
setting means for setting a timing of said timing control means and a transmission cycle of I frame; and
transmitting means for transmitting the image signal, whereby the I frame of the image signal is transmitted with a predetermined timing.

11. A digital camera according to claim 9, further comprising setting means for setting synchronization of a plurality of digital cameras so that transmission timings of I frames are simultaneously performed and transmission cycle times of I frames are identical with each other.

12. A digital camera according to claim 9, further comprising setting means for setting synchronization of a plurality of digital cameras so that transmission timings of I frames are different from each other and transmission cycle times of I frames are identical with each other.

13. A switcher comprising:
- receiving means for receiving image signals from a plurality of cameras for producing digital image signals, which are synchronized;
- buffer means for temporarily storing the image signals of one cycle received from said cameras;
- I frame extracting means for extracting only necessary I frames from the stored image signals in said buffer means;
- timing control means for controlling an operation timing of said I frame extracting means;
- setting means for setting a timing of said timing control means; and
- transmitting means for transmitting the image signals, whereby the I frames of the image signals are extracted from said buffer means and transmitted with a predetermined timing.

14. A switcher according to claim 13, wherein said setting means sets said cameras so that transmission timings of I frames are simultaneously performed and transmission cycle times of I frames are identical with each other.

15. A switcher comprising:
- receiving means for receiving image signals from a plurality of cameras for producing digital image signals, which are synchronized;
- channel switching means for switching channels on which the image signals are received to a channel on a camera for transmitting an I frame;
- timing control means for controlling a switching timing of said channels in said channel switching means;
- setting means for setting a timing of said timing control means; and
- transmitting means for transmitting the image signals, whereby the I frames of the image signals are received and transmitted with a predetermined timing.

16. A switcher according to claim 15, further comprising buffer means for storing part of I frame data of the image signals received from said cameras.

17. A switcher according to claim 13, wherein said setting means sets synchronization of said cameras so that transmission timings of I frames are different from each other and transmission cycles of I frames are identical with each other.

18. A digital camera according to claim 10, further comprising setting means for setting synchronization of a plurality of digital cameras so that transmission timings of I frames are simultaneously performed and transmission cycle times of I frames are identical with each other.

19. A digital camera according to claim 10, further comprising setting means for setting synchronization of a plurality of digital cameras so that transmission timings of I frames are different from each other and transmission cycle times of I frames are identical with each other.

20. A switcher according to claim 15, wherein said setting means sets synchronization of said cameras so that transmission timings of I frames are different from each other and transmission cycles of I frames are identical with each other.

21. A switcher according to claim 16, wherein said setting means sets synchronization of said cameras so that transmission timings of I frames are different from each other and transmission cycles of I frames are identical with each other.

* * * * *